United States Patent
Rajagopalan

(10) Patent No.: US 6,774,184 B2
(45) Date of Patent: Aug. 10, 2004

(54) GOLF BALLS COMPRISING BLENDS OF POLYAMIDES AND IONOMERS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 75 days.

(21) Appl. No.: 10/066,636

(22) Filed: Feb. 6, 2002

(65) Prior Publication Data

US 2002/0147280 A1 Oct. 10, 2002

Related U.S. Application Data

(60) Continuation of application No. 09/333,927, filed on Jun. 16, 1999, now Pat. No. 6,353,058, which is a division of application No. 08/815,659, filed on Mar. 13, 1997, now Pat. No. 6,187,864.

(51) Int. Cl.[7] .............................................. A63B 37/12
(52) U.S. Cl. ..................... 525/183; 473/372; 473/373; 473/374
(58) Field of Search ........................ 525/183; 473/372, 473/373, 374

(56) References Cited

U.S. PATENT DOCUMENTS

| | | | |
|---|---|---|---|
| 3,870,841 A | 3/1975 | Makowski et al. | 260/23.7 R |
| 4,102,876 A | 7/1978 | Brenner et al. | 526/19 |
| 4,234,184 A | 11/1980 | Deleens et al. | 273/235 |
| 4,650,193 A | 3/1987 | Molitor et al. | 273/228 |
| 4,679,795 A | 7/1987 | Melvin et al. | 273/235 |
| 4,801,649 A | 1/1989 | Statz | 525/183 |
| 4,858,924 A | 8/1989 | Saito et al. | 273/62 |
| 4,884,814 A | 12/1989 | Sullivan | 273/235 R |
| 4,919,434 A | 4/1990 | Saito | 273/235 |
| 4,968,038 A | 11/1990 | Yamada | 273/232 |
| 4,986,545 A | 1/1991 | Sullivan | 273/235 |
| 5,098,105 A | 3/1992 | Sullivan | 273/235 |
| 5,120,791 A | 6/1992 | Sullivan | 525/196 |
| 5,155,157 A | 10/1992 | Statz et al. | 524/423 |
| 5,210,138 A | 5/1993 | Yamamoto et al. | 525/183 |
| 5,244,969 A | 9/1993 | Yamada | 524/908 |
| 5,253,871 A | 10/1993 | Viollaz | 273/228 |
| 5,321,089 A | 6/1994 | Cadorniga et al. | 525/196 |
| 5,324,783 A | 6/1994 | Sullivan | 525/196 |
| 5,334,673 A | 8/1994 | Wu | 273/235 |
| 5,359,000 A | 10/1994 | Hamada et al. | 525/74 |
| 5,415,937 A | 5/1995 | Cadorniga et al. | 428/407 |
| 5,422,398 A | 6/1995 | Weiss | 525/178 |
| 5,427,377 A | 6/1995 | Maruoka | 273/230 |
| 5,484,870 A | 1/1996 | Wu | 528/28 |
| 5,492,972 A | 2/1996 | Stefani | 525/196 |
| 5,556,098 A | 9/1996 | Higuchi et al. | 473/373 |
| 5,569,712 A | 10/1996 | Wang et al. | 525/123 |
| 5,679,745 A | 10/1997 | Hamada et al. | 525/195 |
| 5,692,974 A | 12/1997 | Wu et al. | 473/377 |
| 5,713,802 A | 2/1998 | Moriyama | 473/374 |
| 5,730,663 A | 3/1998 | Tanaka | 473/374 |
| 5,730,664 A | 3/1998 | Asakura | 473/374 |
| 5,733,207 A | 3/1998 | Sullivan | 473/378 |
| 5,820,486 A | 10/1998 | Tanaka et al. | 473/374 |
| 5,857,925 A | 1/1999 | Sullivan et al. | 473/374 |
| 5,886,103 A | 3/1999 | Bellinger | 525/179 |
| 6,353,058 B1 * | 3/2002 | Rajagopalan | |
| 2003/0050373 A1 * | 3/2003 | Chen | |

FOREIGN PATENT DOCUMENTS

| | | |
|---|---|---|
| GB | 148 632 A2 | 7/1985 |
| GB | 2 164 342 A | 3/1986 |
| GB | 115 190 B1 | 9/1987 |
| GB | 2 299 999 A | 10/1996 |
| JP | 60-60867 A2 | 4/1985 |
| JP | 62-22841 A2 | 1/1987 |
| JP | 6-192512 A | 7/1994 |
| JP | 155 053 | 6/1996 |
| JP | 8-322962 A | 12/1996 |
| JP | 9-658 A | 1/1997 |

* cited by examiner

*Primary Examiner*—David J. Buttner
(74) *Attorney, Agent, or Firm*—Swidler Berlin Shereff Friedman, LLP

(57) ABSTRACT

The present invention relates to a golf ball comprising at least one core layer, a cover layer, and at least one intermediate layer disposed between the core and the cover, wherein the at least one layer is formed of a polymer composition comprising at least one ionomer and at least one polyamide polymer.

13 Claims, No Drawings

GOLF BALLS COMPRISING BLENDS OF POLYAMIDES AND IONOMERS

CROSS-REFERENCE TO RELATED APPLICATIONS

This application is a continuation of U.S. patent application Ser. No. 09/333,927, filed Jun. 6, 1999, now U.S. Pat. No. 6,353,058, which is a divisional of U.S. patent application Ser. No. 08/815,659, filed Mar. 13, 1997, now U.S. Pat. No. 6,187,864, the entire disclosures of which are incorporated by reference herein.

TECHNICAL FIELD

The present invention is directed to methods and compositions for forming golf ball covers, cores and intermediate layers and a golf ball formed of said compositions having improved properties. The method comprises combining an ionomer and a polyamide-containing polymer to produce a novel compatible blend of polymeric materials used in forming, e.g., golf ball covers, and, more particularly, a golf ball comprising one or more layers formed from substantially compatibilizer-free blends of ionomers and polyamide-containing polymers.

BACKGROUND OF THE INVENTION

Three-piece, wound balls with balata (trans-polyisoprene) covers are typically preferred by professional and low handicap amateur golfers. These balls provide a combination of distance, high spin rate, and control that is not available with an ionomer cover or in one-piece and two-piece balls. However, balata cuts easily, and lacks the durability required by the average golfer.

Two-piece golf balls, which are typically used by the average amateur golfer, provide a combination of durability and maximum distance that is not available with balata covered balls. These balls comprise a core, formed of a solid sphere which typically comprises a polybutadiene based compound, encased in an ionomer cover, such as SURLYN®. Golf ball cover ionomers are, typically, copolymers of an olefin and an unsaturated carboxylic acid in which at least a portion of the carboxylic acid groups have been neutralized with a metal ion. These balls are extremely durable, have good shear resistance and are almost impossible to cut. However, the durability results from the hardness of the ionomer, which gives such balls a very hard "feel" when struck with a golf club that many golfers find unacceptable.

Golf ball manufacturers have attempted to produce golf ball covers that provide the spin rate of balata with the cut resistance of an ionomer by forming blends of high hardness and low hardness ionomers, e.g., U.S. Pat. Nos. 4,884,814, 5,120,791, 5,324,783, 5,415,937 and 5,492,972. However, none of the disclosed ionomer blends have resulted in the ideal balance of carrying distance, coefficient of restitution, spin rate and initial velocity that would approach the highly-desirable playability of a balata covered golf ball.

Manufacturers have also attempted to form blends consisting essentially of hard ionomers with softer, nonionomer polymers to soften the golf ball and improve its feel and spin rate. However, this approach has proven to be difficult because the ionic character of ionomers imparts a highly polar nature to these materials. Therefore, ionomers and other non-ionic polymers, such as balata, and polyolefin homopolymers, copolymers, or terpolymers that do not contain ionic, acidic, basic, or other polar pendant groups, have not been successfully blended for use in golf ball covers. These mixtures often have poor mechanical properties such as inferior tensile strength, impact strength, and the like. Hence, the golf balls produced from these incompatible mixtures will have inferior golf ball properties such as poor durability and cut resistance on impact.

In light of the inferior properties imparted to golf balls by the ionomer and nonionomer polymer blends of the prior art, as described above, other approaches to forming such blends have been attempted by manufacturers. For example, U.S. Pat. Nos. 4,986,545, 5,098,105 and 5,359,000 all disclose compatible or miscible blends between ionomers and nonpolar polymers which have been modified by the addition of polar functionality. Compatibility is accomplished by imparting polar functionality to the nonionomer polymer through a reaction with maleic anhydride. Alternatively, a compatibilizer component has been added to provide or enhance the compatible nature of such blends; see, for example, U.S. Pat. Nos. 5,155,157 and 5,321,089 and Japanese patent application 6192512 A (1994). The compatibilizer material is often a block copolymer, where each block has an affinity for only one of the blend components to be compatibilized, or an epoxy containing compound. However, in each of these disclosures or publications, a costly chemical modification step or an added compatibilizer component is required to compatibilize a blend of one or more ionomers with a polymer that is otherwise incompatible with the ionomer. None of the above disclosures or publications teaches a compatible or miscible blend of an ionomer with a polyamide-containing polymer in the absence of a compatibilizing agent.

It is known in the polymer art that polyethylene-based ionomers may act as emulsifiers or compatibilizers when added to otherwise incompatible blends of a polyamide with a polyolefin. J. M. Willis et al., J. Materials Sci., 26:4742 (1991). For example, uncompatibilized polyamide/polyethylene blends are known to be immiscible or incompatible, that is, characterized by two distinct phases. However, they can be compatiblized by adding a polyethylene-based ionomer during melt blending. Blends of thermoplastics, including nylon, with ionomers having improved low temperature properties, such as flex-crack resistance, are the subject of U.S. Pat. No. 4,801,649 and European Patent Application A2 148,632. Furthermore, blends of nylon 6,6 and ionomer resins are known for their high toughness. (See: O. Olabisi, Encyclopedia of Chemical Technology, 3rd Edition, 18:474 (1982)). However, the use of polyamide-ionomer blends in golf ball compositions or in golf balls is not disclosed by these references.

U.S. Pat. No. 5,244,969 to Yamada discloses golf ball covers comprising a blend of two specific ethylene-acrylic acid copolymer ionomer resins and less than 20% by weight of a polyamide. Yamada does not claim or even disclose, however, a blend of a single ionomer resin and a polyamide.

U.S. Pat. No. 5,427,377 to Maruoka discloses reclaimed golf balls made by applying a thin skin of an ionomer resin optionally blended with a polyamide to resurface a golf ball which has been previously ground so that the dimples and damaged areas are removed. However, the reclaimed golf balls have inferior flying distance and durability compared to virgin golf balls.

Several patents disclose blends of polyamide elastomers and ionomers. For example, U.S. Pat. No. 4,858,924 to Saito et al. discloses the use of 3–35 wt % of a flexible resin, which can include a polyamide elastomer, blended with an ionomer for use as the cover of a golf ball. The cover blend is required to have a flexural modulus within the range of 21,000–64,000 psi (1500–4500 kg/cm$^2$). The polyamide elastomer is said to be incompatible with the ionomer such that it forms a discrete phase dispersed in the ionomer. Saito et al. '924 do not disclose any compatible polyamide-containing polymer and ionomer blends or any hardness requirements for any of the components or for the overall blend.

U.S. Pat. No. 4,919,434 to Saito discloses the use of a polyamide elastomer blended with an ionomer for use as the inner or outer cover of a golf ball. Described only as elastomeric, the polyamide elastomer material is said to have a low flexural modulus and hardness. However, the exact chemical composition or structure of the polyamide elastomer is not disclosed. When blended with an ionomer, the polyamide elastomer-ionomer blend outer cover layer is said to have a flexural modulus of 28,000–71,000 psi (2000–5000 kg/cm$^2$). However, Saito '434 is silent on the hardness characteristics of the blends and of their components.

U.S. Pat. No. 5,556,098 to Higuchi et al. discloses the use of a three-layer golf ball with a soft middle layer composed of a blend of a polyamide elastomer and an ionomer, such that the JIS C hardness of the blend is less than 80. The exact chemical composition or structure of the polyamide elastomer is not disclosed other than that it is said to be a thermoplastic elastomer. Higuchi et al. are silent on the flexural modulus characteristics of these blends and of their components.

It should be noted that none of the above publications on polyamide elastomers and their ionomer blends disclose blends of polyamide/ionomer or copolyamide/ionomer.

Block copoly(amide-ether)s, available commercially as PEBAX® from Elf Atochem S.A., have been disclosed as cover compositions for golf balls, for example, by Deleens et al. in U.S. Pat. No. 4,234,184. These materials are formed by reacting a polyamide that has been end-capped to form an α,ω-dicarboxylic copolyamide with a dihydroxy-terminated polyether. Deleens et al. also provide for the possibility of blends containing the block copoly(amide-ether), but only with a minor proportion of a compatible polymer with a melting point and hardness comparable to the block copolymer.

Cores for multi-piece golf balls, as well as one-piece balls, comprised of blends of an ionomer and a block copoly(amide-ether) are disclosed in U.K. Patent Application GB 2,164,342 A. However, this reference is silent on the hardness and flexural modulus characteristics of the blends or their components.

U.S. Pat. No. 5,253,871 to Viollaz discloses the use of at least 10% of a block copoly(amide-ether), optionally blended with an ionomer, for use as the middle layer of a three-layer golf ball. The Shore D hardness of the block copolymer is said to be within the range of 30–40 Shore D hardness while the corresponding hardness of the ionomer component is said to be between 55–65 Shore D. The overall hardness of the middle layer is said to range from 20–50 Shore D. The cover may also be a block copoly(amide-ether) and ionomer blend but its overall hardness must be greater than that of the adjacent middle layer. However, Viollaz is silent on the flexural modulus characteristics of the blends or their components.

It should be noted that none of the above publications on block copoly(amide-ether)s and their ionomer blends disclose blends of polyamide/ionomer or copolyamide/ionomer.

UK patent application GB 2299999 A discloses a three layer golf ball with a soft cover layer and a hard intermediate layer. The intermediate layer is said to contain at least 5% by weight of a high-rigidity polyamide resin, optionally blended with an ionomer. Preferred polyamides are said to have a stiffness or bending modulus of 140 to 252 kpsi. The bending modulus of the intermediate layer composition is said to range from 56,000 to 112,000 psi, preferably 70,000 to 112,000 psi, while its Shore D hardness is said to range from 65 to 90. The cover layer of the three layer golf ball is said to comprise ionomer resin with a stiffness of 14,000 to 35,000 psi and Shore D hardness of 56 to 64.

It should be noted that this publication does not disclose a blend of copolyamide/ionomer, nor disclose a blend of block polyamide copolymer including main chain polyether blocks/ionomer present in a cover layer, nor does it disclose a blend of polyamide/ionomer present in an intermediate layer that is softer than the cover layer.

None of the blended compositions described above provides the combination of durability and distance that is provided by two-piece golf balls with ionomer covers and the high spin rate and control that is available with three-piece, wound golf balls with balata covers. Therefore, there remains a need for a method of making golf ball cores, intermediate layers and covers that provides for the blending of thermoplastic ionomers with other polymers without the need for compatibilizers which complicate and raise the cost of such a process, to provide one-piece, two-piece and/or multi-layer golf balls with the durability and distance of a SURLYN® covered two-piece ball and the feel, click, and control of a balata covered three-piece ball. The present invention provides such a method, and produces such a product.

SUMMARY OF THE INVENTION

One embodiment of the present invention relates to a golf ball comprising a cover and a core, said cover comprising at least one layer, wherein an outermost layer of said cover is formed of a composition which comprises a substantially compatibilizer-free blend of about 10 wt. % to about 80 wt. % of at least one ionomer and about 90 wt. % to about 20 wt. % of at least one polyamide homopolymer or polyamide copolymer, wherein the polyamide polymer is selected from the group consisting of polyamide homopolymers, polyamide copolymers and mixtures thereof.

A further embodiment of the present invention relates to a golf ball comprising a cover and a core, said cover comprising at least one layer, wherein an outermost layer of said cover is formed of a composition which comprises a substantially compatibilizer-free blend of about 10 wt. % to about 80 wt. % of at least one ionomer and about 90 wt. % to about 20 wt. % of at least one polyamide polymer, with the proviso that the polyamide polymer is not a block polyamide copolymer comprising main-chain polyether blocks. Some examples of block polyamide copolymers that would be excluded under the proviso are block copoly(amide-ether), block copoly(amide-ester-ether) and block copoly(amide-urethane-ether). However, block copoly(amide-ester), block copoly(amide-urethane-ester), block copoly(amide-thioether), block copoly(amide-ester-thioether) and block copoly(amide-urethane-thioether) for example, would not be excluded under the proviso since they have no main chain polyether blocks.

Polyamide polymers useful in the invention include, but are not limited to, polyamide homopolymers, polyamide copolymers, block polyamide copolymers and mixtures thereof. Preferred polyamide homopolymers include nylon 6, nylon 11, nylon 12, nylon 4,6, nylon 6,6, nylon 6,9, nylon 6,10, nylon 6,12 and mixtures thereof. The more preferred polyamide homopolymers are nylon 11 and nylon 12. The flexural modulus of the polyamide homopolymer is at least about 50,000 psi.

Preferred polyamide copolymers include nylon 6/6,6, nylon 6,6/6,10, nylon 6/6,T wherein T represents terephthalic acid, nylon 6/6,6/6,10 and mixtures thereof. The flexural modulus of the polyamide copolymer is at least about 50,000 psi.

Preferred block polyamide copolymers include main-chain blocks selected from the group consisting of polyester, polyurethane, $\alpha,\omega$-hydroxybutadiene oligomer, hydrogenated $\alpha,\omega$-hydroxybutadiene oligomer, wherein the degree of hydrogenation may be partial or substantially complete, and mixtures thereof.

More preferably, the flexural modulus of the polyamide polymer is from at least about 75,000 psi to about 500,000 psi.

Ionomers useful in the invention include but are not limited to olefin, polyester, copoly(ether-ester), copoly (ester-ester), polyamide, polyether, polyurethane, polyacrylate, polystyrene, styrene-butadiene-styrene (also known as SBS), styrene-(hydrogenated butadiene)-styrene wherein the degree of hydrogenation may be partial or substantially complete (also known as SEBS), and polycarbonate homopolymer, copolymer and block copolymer ionomers, and mixtures thereof.

The preferred ionomers comprise a copolymer of an olefin and an $\alpha,\beta$-ethylenically unsaturated carboxylic acid in an amount of between about 5 wt. % to about 30 wt. %, where at least a portion of the carboxylic acid groups are neutralized with a metal ion. In more preferred ionomers, the olefin is ethylene, the $\alpha,\beta$-ethylenically unsaturated carboxylic acid is acrylic or methacrylic acid, and the metal ion is selected from the group consisting of zinc, sodium, magnesium, manganese, calcium, lithium and potassium. In the most preferred ionomers, the carboxylic acid is present to the extent of about 10% to about 20% by weight and the metal ion is zinc. The flexural modulus of the ionomer is at least about 1,000 psi, preferably from at least about 1,000 psi to about 150,000 psi.

The present invention also relates to a golf ball comprising a cover and a core, where the cover is formed of a composition comprising a substantially compatibilizer-free blend of about 10 wt. % to about 80 wt. % of an ionomer resin, where the flexural modulus of the ionomer is at least about 1,000 psi, and about 90 wt. % to about 20 wt. % of at least one polyamide polymer, where the flexural modulus of the polyamide component is at least about 75,000 psi, with the proviso that the polyamide polymer is not a block polyamide copolymer comprising main-chain polyether blocks.

Preferably, the golf ball of the invention comprises a cover and a core, with the cover formed of a composition which is a substantially compatibilizer-free blend of about 15 wt. % to about 75 wt. % of an ionomer resin, where the ionomer comprises a copolymer of ethylene and about 10% to about 20% by weight of acrylic or methacrylic acid, where at least a portion of the carboxylic acid groups are neutralized with zinc and where the flexural modulus of the ionomer is from at least about 1,000 psi to about 150,000 psi, and about 85 wt. % to about 25 wt. % of nylon 11 or nylon 12, where the flexural modulus of the nylon 11 or nylon 12 is from at least about 50,000 psi to about 500,000 psi.

An alternate embodiment of the present invention is directed to a golf ball comprising a cover layer, a core layer and at least one intermediate layer interposed there-between, wherein at least one of said layers is formed of a composition comprising a substantially compatibilizer-free blend of about 10 wt. % to about 80 wt. % of at least one ionomer resin and about 90 wt. % to about 20 wt. % of at least one polyamide polymer, with the proviso that the polyamide polymer is not a block polyamide copolymer comprising main-chain polyether blocks and further that the cover consists essentially of at least one material selected from the group consisting of nonionomer polymer materials and non-olefin ionomers.

A further alternate embodiment of the present invention is directed to a golf ball comprising a cover and a core, said cover comprising at least one layer, wherein an outermost cover layer is formed of a composition which consists essentially of about 5 wt. % to about 95 wt. % of an ionomer and about 95 wt. % to about 5 wt. % of at least one polyamide polymer, with the proviso that the polyamide polymer is not a block polyamide copolymer comprising main-chain polyether blocks.

An additional embodiment of the present invention is a golf ball comprising a cover layer, a core layer and at least one intermediate layer interposed there-between, wherein at least one of said layers consists essentially of about 0 wt. % to about 99 wt. % of at least one ionomer resin and about 100 wt. % to about 1 wt. % of at least one polyamide polymer, with the proviso that the polyamide polymer is not a block polyamide copolymer comprising main-chain polyether blocks and further that the cover consists essentially of at least one material selected from the group consisting of nonionomer polymer materials and non-olefin ionomers.

The invention also relates to a method of making a golf ball, which comprises forming a golf ball core, forming a substantially compatibilizer-free blend comprising about 10 wt. % to about 80 wt. % of at least one ionomer resin and about 90 wt. % to about 20 wt. % of at least one polyamide polymer, with the proviso that the polyamide polymer is not a block polyamide copolymer comprising main-chain polyether blocks, and forming an outermost cover layer upon said ball by molding the blend around the golf ball core.

DETAILED DESCRIPTION OF THE INVENTION

The present invention relates to golf ball forming compositions having unexpectedly improved durability, spin rate and shear resistance. The compositions of the invention comprise blends of a relatively hard polyamide, in the form of a homopolymer, copolymer or block copolymer, with the proviso that the polyamide polymer is not a block polyamide copolymer comprising main-chain polyether blocks, and a relatively soft ionomer resin. Golf balls having covers, cores and/or intermediate layers incorporating the polyamide-ionomer blends of the invention have unexpectedly improved durability, initial velocity, spin rate and shear resistance over prior art golf balls not including such blends. Furthermore, the invention provides great flexibility for selecting the flexural modulus and hardness of each of the blend components over a wider range than is possible with blends composed solely of ionomer components.

It is believed that the unexpectedly improved properties obtained with the golf balls of the present invention result from the compatibility of the polyamide-ionomer blends. When present in a golf ball, a compatible blend will provide a useful product with desirable properties, such as good durability and no cracking when the golf ball is struck repeatedly with a golf club. On the other hand, an incompatible blend imparts inferior properties to a golf ball. For example, a golf ball comprised of an incompatible blend cracks when struck by a golf club or has inferior durability when compared to a golf ball comprising a compatible blend.

The compatibility of the polyamide-ionomer blends disclosed and claimed herein eliminates the need for adding a costly compatibilizing material to the golf ball compositions of the invention. As the compositions of the invention have no added compatibilizing component, this condition is therefore defined and referred to herein as being "substantially compatibilizer-free."

The present invention is directed to methods and compositions for use in the manufacture of golf balls, particularly golf ball cores, covers and intermediate layers. As used herein, an "intermediate layer" is an independent layer between a cover and a core. An intermediate layer may be distinguished from a cover or a core by some difference in the materials comprising the layers. An intermediate layer may, for example, have a distinct composition, a different proportion of components, a different molecular weight of a component, or a different molecular weight distribution of a component when compared to the corresponding attribute of the component comprising the cover or core layers.

Moreover, a "cover" or a "core" as these terms are used herein may comprise a single layer or a plurality of layers. An intermediate layer may be used, if desired, with a multilayer cover or a multilayer core, or with both a multilayer cover and a multilayer core.

The compositions of the present invention comprise substantially compatibilizer-free blends of ionomers and polyamides and/or polyamide copolymers that are compatible with ionomers, such as nylons, nylon copolymers and nylon block copolymers, with the proviso that the polyamide polymer is not a block polyamide copolymer comprising main-chain polyether blocks.

The polyamides have been found to be sufficiently different chemically from, yet compatible with, ionomers to permit bonding between the two without the use of a compatibilizer so as to produce a golf ball having improved properties. This is contrary to the behavior more typically observed in ionomer blends, where incompatibility often results from a blend of an ionomer and another polar polymer, because, although the other blend component polymer may be polar, it may be sufficiently different chemically from an ionomer that the blend lacks the strong interactions required for the polymers to be compatible.

The compatible blends of the invention can be used in the formation of golf ball covers and as intermediate layers for multilayer golf balls. Further, they can additionally be used as covers for two-piece golf balls. The compatible blends of this invention can also be used to form unitary or one-piece golf balls. Additionally, they can be used to form an outer layer of a multi-layer golf ball core for two-piece or three-piece balls.

The present invention is further directed to a method of making a golf ball core, an intermediate layer or a cover, comprising blending one or more ionomers and one or more polyamides, polyamide copolymers or block polyamide copolymers without a compatibilizer such that there is intimate mixing of the different polymeric components to produce a compatible blend suitable for forming into the above golf ball components.

While not wishing to be bound by any particular theory, it is thought that several mechanisms, acting independently or simultaneously, are available to promote compatibility between ionomers and polyamides. First, a free acid component of the ionomer may react with an amine end-group of the polyamide to provide a chemical link between the materials. Alternatively, a coordination-like association may be established between a metal salt of the ionomer and an amine nitrogen of the polyamide. Finally, there may be hydrogen bonding interactions between the ionomer and the polyamide. Any of the above interactions, singly or in combination, is thought to promote intimate compatibility or miscibility, between the amorphous components of the polyamide and the ionomer. The compatible polyamide-ionomer blend is thought to be a stable, homogeneous mixture that exhibits macroscopic properties expected of a single-phase material.

The polyamide component useful in forming the blends of this invention is a thermoplastic with repeating amide groups. These are commonly known as nylons. This component can be comprised of a homopolymer, a copolymer, a block copolymer or a blend of two or more variations of any or all of the above types of polyamides, with the proviso that the polyamide polymer is not a block polyamide copolymer comprising main-chain polyether blocks. Preferably, the polyamide component is a homopolymer, a copolymer or a blend of two or more variations of either or both of these types of polyamides.

Polyamide homopolymers are produced by two common methods. In the first, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, etc., where the number indicates the number of carbon atoms making up the ring in the monomer. The second method involves the condensation polymerization of a dibasic acid and a diamine. These polyamides are commonly designated as nylon 4,6, nylon 6,6, nylon 6,9, nylon 6,10, nylon 6,12, etc., where the first number indicates the number of carbon atoms connecting the two amine groups in the diamine and the second number indicates the number of carbon atoms connecting the two acid groups in the dibasic acid, including those in the acid groups.

Preferred polyamide homopolymers include nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13 and mixtures thereof. More preferred polyamide homopolymers include nylon 6, nylon 11, nylon 12, nylon 4,6, nylon 6,6, nylon 6,9, nylon 6,10, nylon 6,12 and mixtures thereof. The most preferred polyamide homopolymers are nylon 11 and nylon 12.

Polyamide copolymers are produced by several common methods. First, they are produced from ring-opening polymerization by using two or more cyclic monomers with different numbers of carbon atoms making up each monomeric ring. Alternatively, polyamide copolymers are produced from condensation polymerization by using a single dibasic acid and two or more different diamines, each with a different number of carbon atoms separating the two amine groups, by using a single diamine and two or more different dibasic acids, each with a different number of carbon atoms separating the two acid groups, or by using two or more different diamines and dibasic acids. Additionally, polyamide copolymers are produced by blending two or more polyamide melts and holding the materials in the molten state for a sufficient time period such that partial or full randomization occurs. Polyamide copolymers are commonly designated by the separating the symbols for the homopolymers by the symbol "/". For the purposes of this application, the component named first can be either the major or a minor component of the copolymer.

Preferred polyamide copolymers include nylon 6/6,6, nylon 6,6/6,10, nylon 6/6,T wherein T represents terephthalic acid, nylon 6/6,6/6,10 and mixtures thereof.

Block polyamide copolymers are materials which contain main-chain blocks or segments of polyamide or copolyamide separated by main-chain blocks of a different polymer. The separating polymer block may be a polyether, such as a poly(alkylene oxide). When poly(ethylene oxide) is used as the separating polymer block, this material is known commercially as PEBAX®, available from Elf Atochem S.A., GRILAMID®, available from Emser, or VESTAMID®, available from Hüls.

Whereas it has been previously known in the art to utilize block copoly(amide-ether)s such as PEBAX® in golf balls, the applicant has now surprisingly determined that other main-chain separating blocks can be used to replace the polyether separating block in block polyamide copolymers of the compositions and methods of the invention to give golf balls with good properties. Block polyamide copolymer compositions of the invention include main-chain separating blocks comprising polyester, polyurethane, polythioether, polythioester, $\alpha,\omega$-hydroxybutadiene oligomer and hydrogenated $\alpha,\omega$-hydroxybutadiene oligomer.

Preferred block polyamide copolymer compositions of the invention include main-chain separating blocks comprising polyester, known commercially as K-FLEX® available from King Industries and the BAYTEC® MS series and available from Bayer, polyurethane, known commercially as ESTANE® available from the B.F. Goodrich Company and PELLETHANE® available from Dow Chemical, $\alpha,\omega$-hydroxybutadiene oligomer or hydrogenated $\alpha,\omega$-hydroxybutadiene oligomer, wherein the degree of hydrogenation may be partial or substantially complete, the two latter materials known commercially as POLYBD® resins and available from Elf Atochem S.A. Block polyamide copolymers comprising mixtures of these main chain blocks are also preferred. These materials are particularly desirable because they provide an alternative to the costly block polyamide copolymers with polyether separating blocks.

The polyamide component of this invention has a Shore D hardness of at least about 70, as measured by ASTM method D-2240, a flexural modulus, as measured by ASTM method D-790, of at least 50,000 psi, preferably from about 75,000 psi to about 500,000 psi, and a melt index from about 0.5 to about 10 g/10 min, as measured by ASTM method D-1238, condition E using a 2.16 kg weight.

The ionomer component useful in forming the blends of this invention is a polymer which comprises acidic groups, such as carboxylate or sulfonate, or basic groups, such as quaternary nitrogen, the acidic or basic groups being at least partially neutralized with a conjugate acid or base. Negatively charged acidic groups, such as carboxyl or sulfonate, may be neutralized with a cation, such as a metal ion. Positively charged basic groups, such as quaternary nitrogen, may be neutralized with an anion, such as a halide, an organic acid, or an organic halide. Acidic or basic groups may be incorporated into an ionomer through copolymerization of an acidic or basic monomer, such as alkyl (meth) acrylate, with at least one other comonomer, such as an olefin, styrene or vinyl acetate, followed by at least partial neutralization to form an ionomer. Alternatively, acidic or basic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization. As used herein "non-olefin ionomers" are those ionomers prepared substantially in the absence of olefin comonomers and those ionomers prepared by functionalizing polymers which were prepared substantially in the absence of olefin monomers or comonomers.

The ionomers useful in the compositions of the invention are typically thermoplastic ionomers, and include but are not limited to olefin, polyester, copoly(ether-ester), copoly (ester-ester), polyamide, polyether, polyurethane, polyacrylate, polystyrene, SBS, SEBS, and polycarbonate homopolymer, copolymer and block copolymer ionomers. Preferably, the ionomer is a copolymer of an olefin and an $\alpha,\beta$-ethylenically unsaturated carboxylic acid, where at least a portion of the carboxylic acid groups are neutralized with a metal ion. More preferably, the olefin is ethylene, and the $\alpha,\beta$-ethylenically unsaturated carboxylic acid is acrylic or methacrylic acid, where the metal ion is zinc, sodium, magnesium, manganese, calcium, lithium or potassium. Most preferably, the metal ion is zinc. Preferably, the percent neutralization of the ionomer is from about 20 mol % to about 80 mol %. Preferably, the acid comonomer content is from about 5 wt. % to about 30 wt. %, more preferably from about 10 wt. % to about 25 wt. %, most preferably from about 10 wt. % to about 20 wt. %. As used herein, the terms ionomer, ionomer resin, and thermoplastic ionomer are synonymous.

The ionomer component of this invention has a Shore D hardness of at least about 20, as measured by ASTM method D-2240, preferably from about 25 to about 75, a flexural modulus, as measured by ASTM method D-790, of at least about 1,000 psi, preferably from about 1,000 psi to about 150,000 psi, and a melt index from about 0.5 to about 8 g/10 min, as measured by ASTM method D-1238, condition E using a 2.16 kg weight, preferably from about 0.6 to about 6 g/10 min and more preferably from about 0.9 to about 5 g/10 min.

The compositions of the present invention comprise a blend of about 0 wt. % to about 99 wt. % of an ionomer component, preferably about 1 wt. % to about 99 wt. % of an ionomer component, more preferably about 5 wt. % to about 95 wt. %, even more preferably about 10 wt. % to about 80 wt. %, most preferably about 15 wt. % to about 75 wt. %, and about 100 wt. % to about 1 wt. % of a polyamide component, preferably about 99 wt. % to about 1 wt. % of a polyamide component, more preferably about 95 wt. % to about 5 wt. %, even more preferably about 90 wt. % to about 20 wt. %, most preferably about 85 wt. % to about 25 wt. %.

Alternatively, if desired, an intermediate layer in a golf ball constructed according to the invention can be about 1 wt. % up to about 100 wt. % polyamide when the cover consists essentially of at least one material selected from the group consisting of nonionomer polymer materials and non-olefin ionomers. The nonionomer polymer material in the construction described above may be a thermoplastic polymer, including a functionalized polymer, a copolymer or a functionalized copolymer, or mixtures thereof, that includes, but is not limited to: polyamide; polycarbonate; poly(phenylene oxide); imidized, amino group containing polymers; high impact polystyrene (hereafter HIPS); polysulfone; poly(phenylene sulfide); reinforced engineering plastics; polytetrafluoroethylene; nonionic olefinic homopolymers and copolymers, such as those produced by using free radical, ionic, Ziegler-Natta or metallocene catalysts, including but not limited to a polymer comprising an α-olefin containing from 2 to 10 carbon atoms, poly(ethylethylene), poly(heptylethylene), poly(hexyldecylethylene), poly(isopentylethylene), poly(ethylene-propylene), poly(ethylene-butene), poly(ethylene-vinyl acetate) and poly(ethylene-vinyl alcohol); poly(butyl acrylate); poly(4-cyanobutyl acrylate); poly(2-ethylbutyl acrylate); poly(heptyl acrylate); poly(2-methylbutyl acrylate); poly(3-methylbutyl acrylate); poly(N-octadecylacrylamide); poly(octadecyl methacrylate); polybutoxyethylene; polymethoxyethylene; polypentyloxyethylene; poly(1,1-dichloroethylene); poly(cyclopentylacetoxyethylene); poly(4-dodecylstyrene); poly(4-tetradecylstyrene); poly(oxyethylethylene); poly(oxytetramethylene); poly(oxytrimethylene); poly(oxycarbonylpentamethylene); poly(oxycarbonyl-3-methylpentamethylene); poly(oxycarbonyl-1,5-dimethylpentamethylene); polysilazane; poly(furan tetracarboxylic acid diimide); polyacrylonitrile; poly(α-methylstryrene); poly(acrylonitrile-butadiene); poly(ethylene terephthalate); poly(butylene terephthalate); poly(vinyl alcohol); poly(vinyl acetate); polysilane; poly(siloxane); poly(vinylidene fluoride); poly(methyl acrylate); poly(methyl methacrylate); acrylonitrile-butadiene-styrene copolymer (hereafter ABS); poly(urethane); and poly(urea).

In embodiments wherein an intermediate layer in a golf ball constructed according to the invention comprises polyamide, the nonionomer polymer material may also be a thermoset polymer, including a functionalized thermoset polymer, a thermoset copolymer or a functionalized thermoset copolymer, or mixtures thereof, that includes, but is not limited to: poly(isoprene), both natural and synthetic; poly(butadiene); poly(chloroprene); poly(urethane); poly(siloxane); styrene-butadiene rubber; ethylene-propylene-diene rubber; nitrile rubber; butyl rubber; chlorotrifluoroethylene copolymer rubber; vinylidene fluoride-hexafluoropropylene copolymer rubber; polysulfide rubber; epichlorohydrin rubber; poly(urea); poly(ester); phenolic resin; epoxy resin; and any nonionomer thermoplastic polymer which may be crosslinked.

When an intermediate layer in a golf ball constructed according to the invention comprises polyamide, the cover may also consist essentially of at least one non-olefin ionomer. The non-olefin ionomer useful in the construction described above may be a functionalized non-olefin ionomer, a copolymer non-olefin ionomer or a functionalized copolymer non-olefin ionomer, or mixtures thereof, that includes, but is not limited to: polyester, copoly(ether-ester), copoly(ester-ester), polyamide, polyether, polyurethane, polyacrylate, polystyrene, styrene-butadiene-styrene (also known as SBS), styrene-(hydrogenated butadiene)-styrene wherein the degree of hydrogenation may be partial or substantially complete (also known as SEBS), and polycarbonate homopolymer, copolymer and block copolymer ionomers.

Preferably, when an intermediate layer in a golf ball constructed according to the invention comprises polyamide, the cover consists essentially of at least one material selected from the group consisting of nonionomer polymer materials and non-olefin ionomers.

More preferably, when an intermediate layer in a golf ball constructed according to the invention comprises polyamide, the cover consists essentially of a non-olefin ionomer comprising at least one material selected from the group consisting of: polyester, polystyrene, SBS, SEBS and polyurethane homopolymer, copolymer and block copolymer ionomers.

More preferably, when an intermediate layer in a golf ball constructed according to the invention comprises polyamide, the cover consists essentially of a nonionomer polymer material comprising at least one material selected from the group consisting of: nonionic olefinic homopolymers and copolymers; polyamide; poly(methyl acrylate); poly(methyl methacrylate); ABS; poly(urethane); poly(urea); poly(isoprene); and poly(butadiene).

Most preferably, when an intermediate layer in a golf ball constructed according to the invention comprises polyamide, the cover consists essentially of a nonionomer polymer material comprising at least one material selected from the group consisting of: nonionic olefinic homopolymers and copolymers; polyamide; poly(isoprene); poly(butadiene); a poly(urethane) such as those described by U.S. Pat. No. 5,334,673, the contents of which are incorporated herein in their entirety; and a poly(urea) such as those described by U.S. Pat. No. 5,484,870, the contents of which are incorporated herein in their entirety.

In another embodiment, the compositions of the invention comprise a blend of about 10 wt. % to about 80 wt. % of an ionomer component, preferably about 15 wt. % to about 75 wt. %, wherein the ionomer comprises a copolymer of an olefin and an α,β-ethylenically unsaturated carboxylic acid, wherein at least a portion of the carboxylic acid groups are neutralized with a metal ion, and about 90 wt. % to about 20 wt. % of a polyamide component, preferably about 85 wt. % to about 25 wt. %, wherein the flexural modulus of the polyamide component is at least about 75,000 psi, with the proviso that the polyamide polymer is not a block polyamide copolymer comprising main-chain polyether blocks.

In a further embodiment, the compositions of the invention comprise a blend of about 10 wt. % to about 80 wt. % of an ionomer component, preferably about 15 wt. % to about 75 wt. %, wherein the flexural modulus of the ionomer is at least about 1,000 psi, and about 90 wt. % to about 20 wt. % of a polyamide component, preferably about 85 wt. % to about 25 wt. %, wherein the polyamide is selected from the group consisting of nylon 6, nylon 11, nylon 12, nylon 4,6, nylon 6,6, nylon 6,9, nylon 6,10, nylon 6,12 and mixtures thereof.

In another embodiment, the compositions of the invention comprise a blend of about 10 wt. % to about 80 wt. % of an ionomer component, preferably about 15 wt. % to about 75 wt. %, wherein the ionomer comprises a copolymer of ethylene and about 5% to about 30% of acrylic or methacrylic acid, wherein at least a portion of the carboxylic acid groups are neutralized with zinc, and about 90 wt. % to about 20 wt. % of a polyamide component, preferably about 85 wt. % to about 25 wt. %, wherein the polyamide homopolymer is nylon 11 or nylon 12.

In a still further embodiment the compositions of the invention comprise a blend of about 10 wt. % to about 80 wt. % of an ionomer component, preferably about 15 wt. % to about 75 wt. %, wherein the flexural modulus of the ionomer is from at least about 1,000 psi to about 150,000 psi, and about 90 wt. % to about 20 wt. % of a polyamide component, preferably about 85 wt. % to about 25 wt. %, wherein the polyamide is selected from the group consisting of polyamide homopolymers, polyamide copolymers, block polyamide copolymers and mixtures thereof, with the proviso that the polyamide polymer is not a block polyamide copolymer comprising main-chain polyether blocks.

An additional embodiment of the present invention is a golf ball comprising a cover layer, a core layer and at least one intermediate layer interposed there-between, wherein at least one of said layers consists essentially of about 1 wt. % to about 99 wt. % of at least one ionomer resin and about 99 wt. % to about 1 wt. % of at least one polyamide polymer, with the proviso that the polyamide polymer is not a block polyamide copolymer comprising main-chain polyether blocks and further that the cover consists essentially of at least one material selected from the group consisting of nonionomer polymer materials and non-olefin ionomers.

Additional materials conventionally included in golf ball cover compositions may be added to the compositions of the invention if desired. These additional materials include, but are not limited to, dyes, whitening agents, UV absorbers, optical brighteners, processing aids, and other conventional additives. Additional materials conventionally included in golf ball compositions may be added to the compositions of the invention if desired. These additional materials include, but are not limited to, antioxidants, stabilizers, softening agents, plasticizers, including internal and external plasticizers, compatibilizers, impact modifiers, toughening agents, and reinforcing materials. All of these materials, which are well known in the art, are added for their usual purpose in typical amounts.

Nucleating agents may optionally be added to the polyamide component or to the blends of the invention. They are thought to be able to beneficially alter the properties of a polyamide component which is not amorphous by changing its semicrystalline nature, such as its degree of crystallinity and the distribution of crystallite sizes. A nucleating agent typically leads to greater uniformity in the rate of crystal growth and in the size, number and type of crystals formed from the molten polyamide. The more uniform crystalline texture produced by the added nucleating agent may result in increased flexural modulus and hardness. Nucleating agents such as finely dispersed silicas may be added in typical amounts, as is known to those with skill in the art.

The blends are formed by combining the polymer components by methods familiar to those in the polymer blending art, for example, with a two roll mill, a Banbury mixer or a single or twin-screw extruder, to produce a compatible blend. Preferably, the normally higher-melting polyamide component is first melted in the main extruder and the molten ionomer is introduced as a side-stream into a main extruder conveying molten polyamide where the two melts are intermixed to form a compatible blend. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type.

Once the compatible blends are formed in the extruder or in other polymer processing equipment known in the art, conventional equipment used in the production of golf balls may be used to form the golf balls of the invention. For example, golf balls and golf ball covers comprising the cover compositions of the invention can be made by injection molding cover stock formed from the compatible polyamide-ionomer blends of the invention around a core or by compression molding pre-formed half-shells of the cover stock into a half-shell mold in a conventional manner. After molding, golf balls comprising the compatible polyamide-ionomer blend compositions of the invention can be finished by buffing, painting, and stamping.

Forming a compatible blend of two or more ionomers and polyamides dramatically improves the ability to control the mechanical properties of the blends, including flexural modulus and hardness. Golf balls and golf ball covers produced from incompatible polymer blends lack durability, and crack or split into pieces when hit with a golf club. In contrast, the compatible blends of the invention provide golf balls and covers a having the durability and distance of ionomer covered two-piece balls and the feel, click and control of balata covered three-piece balls.

Unless otherwise noted, all % values given herein are by weight percent (i.e. wt. %).

EXAMPLES

The following non-limiting examples are merely illustrative of the preferred embodiments of the present invention, and are not to be construed as limiting the invention, the scope of which is defined by the appended claims.

Tests were performed to compare the initial velocity, durability, spin rate, shear resistance and other properties of two-piece golf balls with covers based on a blend of a polyamide and an ionomer to control two-piece golf balls with covers based on a blend of ionomer resins. The polymer blends are given in Tables I and II, where the amount of each component is given in weight %.

The initial velocity is determined using a Titleist-made Dual Pendulum Testing Machine configured to strike a golf ball with a face-plate angled at approximately 13°.

The coefficient of restitution or COR is evaluated by shooting a golf ball out of an air cannon at a steel plate. COR is calculated by dividing the rebound velocity of the golf ball by the incoming velocity. Thus, a ball with a high coefficient of restitution dissipates a smaller fraction of its total energy when colliding with the plate and rebounding therefrom than does a ball with a low coefficient of restitution. COR testing is conducted over a range of incoming velocities and determined at an inbound velocity of 125 ft/s.

Durability is determined by using a hitting machine to hit a golf ball into a catching net, then automatically returning the ball into position where it is hit again. The test continues until the pre-set number of hits is reached, 600 hits being the maximum number of hits used herein, or until the golf ball fails, as judged by visual observations. A minimum sample size of 12 golf balls is used, each subjected to the pre-set number of hits.

The spin rate is determined from the average spin rate obtained by striking six golf balls four times each using a True Temper mechanical Golf Swing Machine configured with either a driver (at a launch angle of approximately 9°) or an 8-iron (at a launch angle of approximately 19°), taking high-speed photographs of the golf ball after it has been struck, digitizing the photographic images, and performing computer assisted image analysis to determine the spin rate in revolutions per minute.

The shear resistance rating is determined by using a Miya mechanical Golf Swing Machine to make two hits on each of 6–12 substantially identical golf balls of the same composition with either a sand wedge or a pitching wedge. First, the test conditions are adjusted and verified so that a control golf ball with a balata cover produces a rating of 5 on the shear resistance rating scale where a numerical rating from 1 (best: no visible damage to cover or paint) to 5 (worst: excessive cover shear, heavy material removal or severe material removal) is assigned. Following the calibration procedure, each experimental golf ball is tested and assigned a rating based upon visible manifestations of damage after being struck.

Hardness (Shore D) is determined by ASTM method D-2240, flexural modulus is determined by ASTM method D-790 and melt index is determined by ASTM method D-1238, condition E using a 2.16 kg weight.

Example 1 incorporates a cover blend of nylon 12 and a commercially available very low modulus ionomer believed to comprise about 9–12 percent acid and to be neutralized with zinc. Example 2 incorporates a cover blend of nylon 12 and a commercially available very low modulus ionomer believed to comprise about 9–12 percent acid and to be neutralized with sodium. Example 3 incorporates a cover blend of nylon 6 and a commercially available very low modulus ionomer believed to comprise about 9–12 percent acid and to be neutralized with zinc. Examples 4 and 5 incorporate a cover blend of nylon 11 and a commercially available ionomer believed to comprise about 9–12 percent acid and to be neutralized with zinc. Examples 6 through 9 incorporate a cover blend of nylon 12 and a commercially available very low modulus ionomer believed to comprise about 9–12 percent acid and to be neutralized with zinc.

Control C1 incorporates a cover blend of two commercially available ionomers (55% of a very low modulus ionomer believed to comprise 9–12% acid and to be neutralized with sodium and 45% of an ionomer believed to comprise 13–17% acid and to be neutralized with lithium) of the type such as is used in certain commercial golf balls for the purposes of comparison with the examples. Control C2 incorporates a cover blend of two commercially available ionomers (50% of an ionomer believed to comprise 13–17% acid and to be neutralized with lithium and 50% of an ionomer believed to comprise 17–20% acid and to be neutralized with sodium) of the type such as is used in certain commercial golf balls for the purposes of comparison with the examples.

Golf balls incorporating the blends of polyamide and ionomer of the invention have improved golf ball properties with durability comparable to or better than the controls. The examples demonstrate that blends incorporating nylon 12, nylon 11 and nylon 6 can sustain over 600 hits before the failure of a single ball. Furthermore, the golf balls of all the examples have good initial velocity, spin rate and shear resistance.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

TABLE I

|  | Example Number[a] | | | | |
|---|---|---|---|---|---|
|  | 1 | 2 | 3 | 4 | 5 |
| Polyamide 12[b] | 50 | 50 | — | — | — |
| Polyamide 11[c] | — | — | — | 25 | 35 |
| Polyamide 6[d] | — | — | 50 | — | — |
| SURLYN 9320[e] | 50 | — | 50 | — | — |
| SURLYN 9020[f] | — | — | — | 75 | 65 |
| SURLYN 8320[g] | — | 50 | — | — | — |
| Ball Cover Hardness (Shore-D) | 62 | 61 | 60 | 69 | 61 |
| Initial Velocity (ft/sec) | 249.8 | 250.3 | 248.0 | 250.9 | 251.2 |
| Durability Test, First Failure at # of Hits Up to 600 Hits | 435 | None | None | None | None |
| Durability Test, 50% Failure Up to 600 Hits | None | None | None | None | None |
| Spin Rate from Driver (rpm) | 3195 | 3118 | 3338 | 3192 | 3107 |
| Spin Rate from 8-Iron (rpm) | 7367 | 7559 | 7661 | 7472 | 7421 |
| Shear Resistance Rating[h] | 3.5 | 3 | 1.5 | 3 | 3 |
| Core Diameter (inches) | 1.55 | 1.58 | 1.55 | 1.58 | 1.58 |
| Core Compression (PGA) | 95 | 88 | 95 | 88 | 88 |

[a]Injection molded over core
[b]RILSAN AMNO Nylon 12, flexural modulus of about 174 kpsi
[c]RILSAN BMNO Nylon 11, flexural modulus of about 160 kpsi
[d]TEXAPOL Nylon 6, flexural modulus of about 400 kpsi
[e]9–12% acid very low modulus ionomer neutralized with zinc
[f]9–12% acid ionomer neutralized with zinc
[g]9–12% acid very low modulus ionomer neutralized with sodium
[h]1 is best, 5 is worst

TABLE II

|  | Example Number[a] | | | | Control 1[b] | Control 2[c] |
|---|---|---|---|---|---|---|
|  | 6 | 7 | 8 | 9 | | |
| Polyamide 12[d] | 25 | 50 | 75 | 85 | — | — |
| SURLYN 9320[e] | 75 | 50 | 25 | 15 | — | — |
| Ball Cover Hardness (Shore-D) | 51 | 57 | 67 | 67 | 53 | 69 |
| Initial Velocity (ft/sec) | 249.5 | 249.9 | 251.0 | 251.7 | 250.3 | 253.3 |
| Coefficient of Restitution @ 125 ft/sec | 0.781 | 0.790 | 0.805 | 0.809 | 0.797 | 0.822 |
| Durability Test, First Failure at # of Hits Up to 600 Hits | 350 | None | None | None | 450 | 550 |
| Durability Test, 50% Failure Up to 600 Hits | 500 | None | None | None | None | None |
| Spin Rate from Driver (rpm) | 3492 | 3111 | 2828 | 2767 | 3323 | 2957 |

TABLE II-continued

| | Example Number[a] | | | | | |
|---|---|---|---|---|---|---|
| | 6 | 7 | 8 | 9 | Control 1[b] | Control 2[c] |
| Spin Rate from 8-Iron (rpm) | 8393 | 7724 | 7683 | 7835 | 8322 | 7874 |
| Shear Resistance Rating[f] | 2.1 | 1.9 | 1.4 | 1.2 | 5 | 1.3 |

[a]Injection molded over 1.58" diameter core with 88 PGA core compression (except controls which are compression molded)
[b]55% SURLYN 8320 (9–12% acid very low modulus ionomer neutralized with sodium)/45% SURLYN 7940 (13–17% acid ionomer neutralized with lithium)
[c]50% SURLYN 7940/50% SURLYN AD8140 (17–20% acid ionomer neutralized with sodium)
[d]RILSAN AMNO Nylon 12, flexural modulus of about 174 kpsi
[e]9–12% acid very low modulus ionomer neutralized with zinc
[f]1 is best, 5 is worst

What is claimed is:

1. A golf ball comprising:
   a core;
   a cover comprising a non-ionomeric polymer material comprising a thermoset polymer; and
   an intermediate layer disposed between the core and the cover, wherein the intermediate layer comprises a polymer composition comprising at least one ionomer and at least one polyamide polymer.

2. The golf ball of claim 1, wherein the thermoset polymer comprises a functionalized thermoset polymer, a thermoset copolymer, a functionalized thermoset copolymer, or mixtures thereof.

3. The golf ball of claim 2, wherein the thermoset polymer comprises polyurethane.

4. The golf ball of claim 2, wherein the thermoset polymer comprises polyurea.

5. The golf ball of claim 1, wherein the thermoset polymer comprises transpolyisoprene.

6. The golf ball of claim 1, wherein the ionomer comprises homopolymers or copolymers of olefin, polyester, copoly(ether-ester), copoly(ester-ester), polyamide, polyimide, polyether, polyurethane, polyacrylate, polystyrene, hydrogenated styrene butadiene styrene, polycarbonate, or mixtures thereof.

7. The golf ball of claim 1, wherein the jonomer comprises a copolymer of an olefin and an α,β-ethylenically unsaturated mono- or di-carboxylic acid, wherein the carboxylic acid groups are at least partially neutralized with at least one metal ion.

8. The golf ball claim 7, wherein the metal ion comprises zinc, sodium, magnesium, manganese, calcium, lithium, or potassium.

9. The golf ball of claim 1, wherein the polyamide polymer is selected from the group consisting of nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13, and mixtures thereof.

10. A golf ball comprising:
    a core;
    a cover comprising a non-ionomeric polymer material comprising at least one thermoset polvmer; and
    an intermediate layer disposed between the core and the cover, wherein the intermediate layer comprises a polymer composition comprising about 10 percent to about 80 percent of at least one ionomer and about 90 percent to about 20 percent of at least one polyamide polymer, with the proviso that the at least one polyamide polymer is not a block polyamide copolymer comprising main-chain polyether blocks.

11. The golf ball of claim 10, wherein the ionomer is present in an amount of about 15 percent to about 75 percent by weight of the polymer composition, and wherein the polyamide polymer is present in an amount of about 85 percent to about 25 percent by weight of the polymer composition.

12. The golf ball of claim 10, wherein the at least one polyamide polymer is selected from the group consisting of polyamide homopolymers, polyamide copolymers, block polyamide copolymers, and mixtures thereof.

13. The golf ball of claim 10, wherein the at least one ionomer comprises a copolymer of ethylene and about 5 percent to about 30 percent acrylic acid or methacrylic acid.

* * * * *